April 25, 1967  R. O. ISENBARGER  3,316,022
HUB CAP ASSEMBLY

Filed Oct. 15, 1965  2 Sheets-Sheet 1

INVENTOR
ROBERT O. ISENBARGER
BY Greist, Lockwood,
Greenawalt & Dewey  ATT'YS.

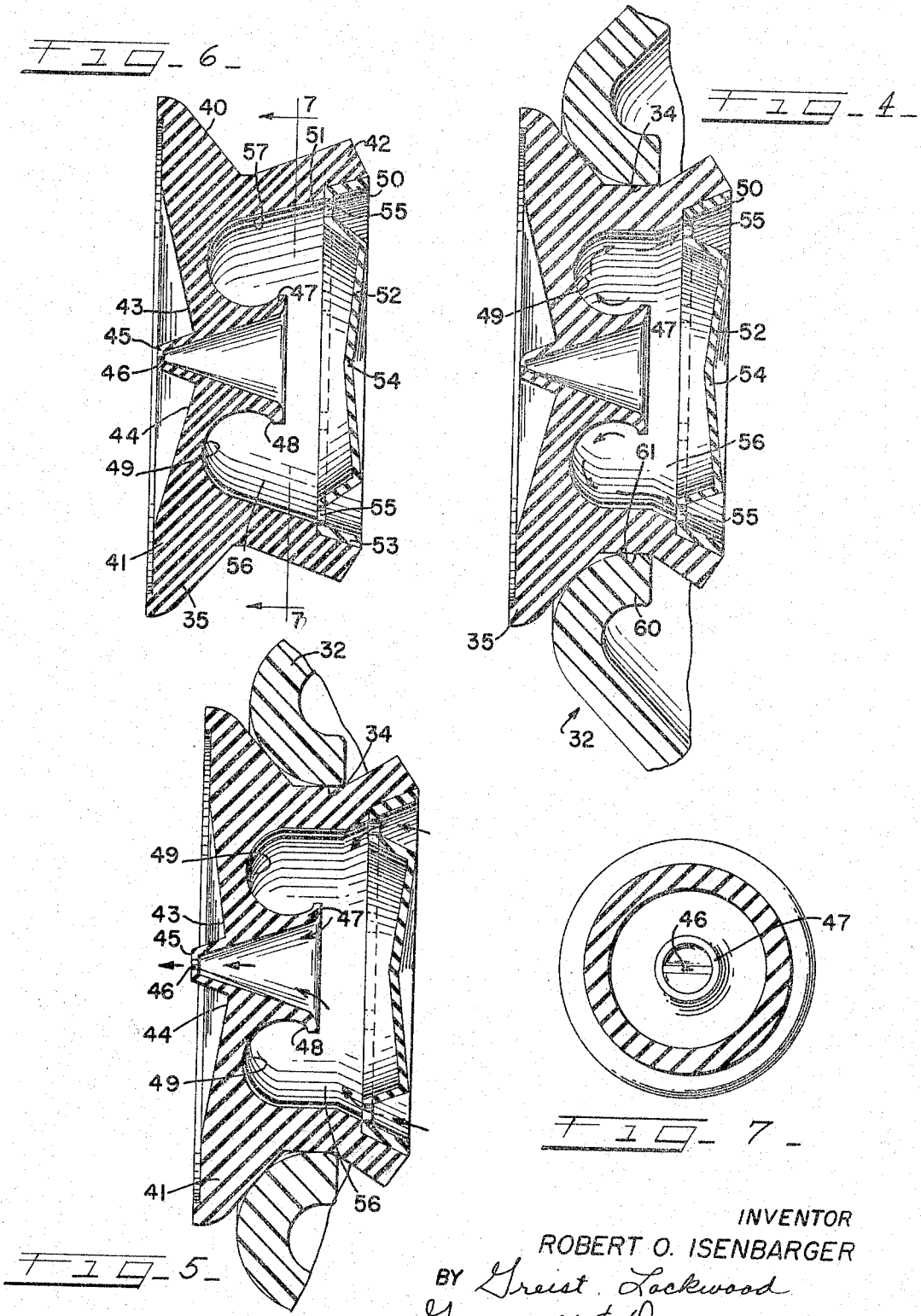

United States Patent Office 3,316,022
Patented Apr. 25, 1967

3,316,022
HUB CAP ASSEMBLY
Robert O. Isenbarger, Chicago, Ill., assignor to Chicago Rawhide Manufacturing Company, Chicago, Ill., a corporation of Illinois
Filed Oct. 15, 1965, Ser. No. 496,610
5 Claims. (Cl. 301—108)

This invention relates to a new and improved hub cap assembly for wheel housings, particularly in tractor and trailer wheel and axle units, wherein the wheel housing establishes a reservoir for free flowing lubricant. More specifically, the invention deals with a hub cap including a specific uniquely formed and mounted window means of improved design which permits easy mounting, removal, and adding to the lubricant supply as becomes necessary from time to time.

Trailer wheel and axle assemblies, especially the assemblies used on large trailers and oftentimes tractors, basically involves the mounting of a wheel on a fixed axle or spindle for rotation. The hub of the wheel is radially spaced from the fixed spindle to define an annular lubricant reservoir which provides lubrication for the wheel bearings supporting the wheel on the spindle. The flowable lubricant within the reservoir provides a bath-like action and is confined at the inner side of the hub by a dynamic seal, while a hub cap cover assembly closes off the outer end.

Hub cap means with a venting arrangement communicating with the lubricant reservoir to provide for pressure equalization as such are old in the art. The necessity of venting for pressure equalization is self-evident since the trailer will operate in temperatures ranging from subzero to in excess of 100° F. resulting in volumetric changes. This ignores changes in internal volume due to heating of the lubricant by friction between the relatively rotatable parts. Thus, in the past an open vent or orifice of small diameter above the lubricant level has been used to keep the pressure between the lubricant chamber and the ambient equal. Open type vents or orifices are unsatisfactory in that oil vapor or mist can escape as well as small oil drops which splash on the orifice and adhere, being forced out by a subsequent increase in pressure with the undesirable consequences. Also, foreign matter such as water and dust can freely enter the lubricant chamber with the expected adverse effects. Two desirable forms of hub cap assemblies are disclosed in Patents Nos. 3,114,579 and 3,177,041, granted to me on Dec. 17, 1963, and Apr. 6, 1965, respectively, which show a solution to the problem outlined above. This application is directed to an invention which is an improvement over these hub cap assemblies and associated venting arrangements.

In the latter of the above patents, an axial sleeve is provided on the end of the hub and is closed off at the outer extremity by a transparent window. A vent-type plug is received in the central opening in the transparent window, being removably retained in place by threads on the vent-type plug received in the opening. Inadvertent over-tightening of the vent-type plug can cause the associated sealing member to lock it within the opening precluding removal without fear of damaging the parts. The center of the transparent window must be made of sufficient thickness to accommodate threading for co-operation with the threaded vent-type plug which is not wholly desirable for a number of reasons.

The present invention relates to a new and improved vent-type filler plug and clear plastic hub cap, both of which are easily installed. The novel plug is formed of two elastomeric elements joined in a unitary construction and may be installed by merely pushing it into a smooth opening formed in the center of the transparent hub cap. It may be easily removed also by one's fingers or a screwdriver to gain access to the lubricant chamber. The filler plug of the present invention provides better valving and venting action than found in prior art designs and is self-cleaning to avoid becoming clogged. Its reduced axial dimension permits the use of a shorter hub cap housing or conversely greater axle extension can be accommodated. The valving or venting action is of a positive nature due to a novel diaphragm and vent arrangement in order to prevent the escape of the lubricant and even oil mist. Although oil mist loss is negligible, when it contacts the trailer wheel, hub and surrounding structure it spreads over an amazingly large area. Mixed with the usual road film, dust, dirt and the like, it gives an impression that the oil loss is appreciable, not to mention the unattractive appearance and difficulty experienced in effecting removal. The unique diaphragm arrangement also prevents oil splash from collecting on the vent proper where it may ultimately be pushed out by an increase in reservoir pressure oftentimes occurring during operation.

Other advantages of the present invention will become apparent when the objects and description are considered.

It is an object of the invention to provide a new and improved hub cap assembly adapted for application to a wheel, the hub cap including as a part of the assembly a specially shaped and mounted vent-type filler plug received in a novelly shaped opening in a window-type cap.

Another object of the invention is to provide a new and improved hub cap assembly having a new and improved vent-type filler plug means which will operate to relieve any change in pressure between the lubricant chamber and the ambient without permitting escape of oil mist, splash or the like.

Still a further object of this invention is to provide a vent-type filler plug which is easily installed and removed, and which provides better venting action and will be more effective in keeping out water, dust, dirt and the like.

Other objects not specifically set forth will become apparent from the following detailed description of the invention made in conjunction with the accompanying drawings wherein:

FIG. 4 is an enlarged cross sectional view of the window member of the hub cap and filler plug in the installed position;

FIG. 5 is a view similar to FIG. 4 illustrating the filler plug with the valve in the open condition to relieve pressure;

FIG. 6 is a free body cross sectional view of the filler plug shown in FIGS. 1–5; and FIG. 7 is a cross sectional view on a reduced scale taken along the lines 7—7 of FIG. 6.

Figure 1:
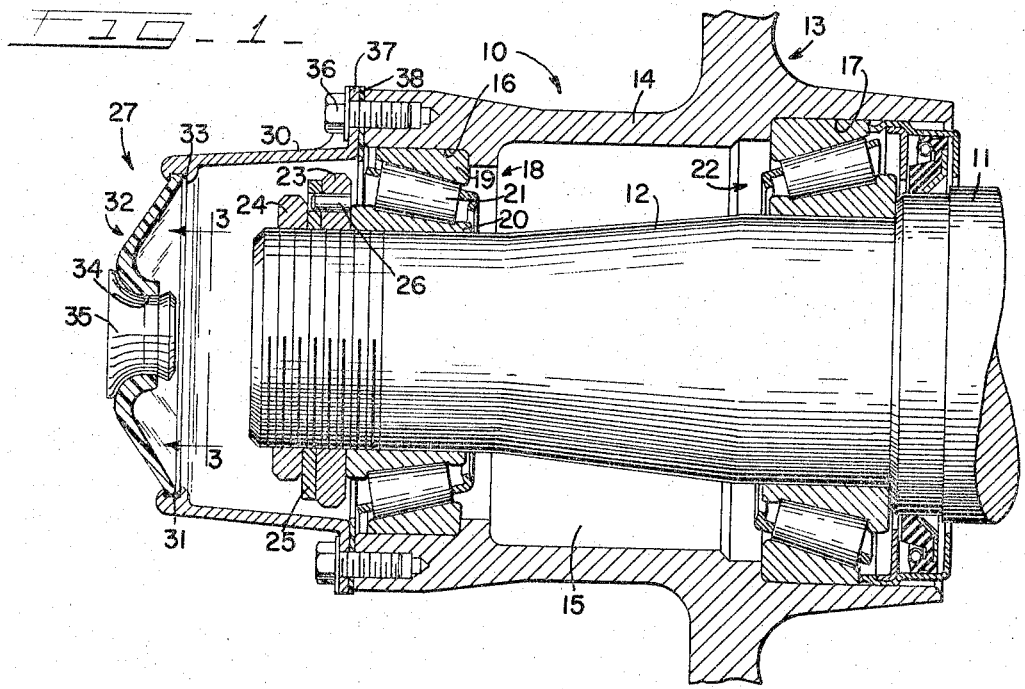
FIG. 1 is a fragmentary section of a known type of trailer wheel assembly illustrating the hub cap assembly of the present invention operatively mounted.

A typical trailer wheel assembly is indicated generally by reference numeral 10 in FIG. 1 and includes a fixed axle 11 having a spindle 12 forming a part of the axle and about which a wheel 13 is received for rotation. The wheel 13 includes a hub portion 14 having coaxial spaced bores 16 and 17. The bore 16 has mounted therein a roller bearing assembly indicated generally at 18 which includes an outer race 19, an inner race 20 received around the spindle 12 with a press fit, and a plurality of antifriction roller members 21 mounted for rolling movement between the outer race 19 and inner race 20. An inner bearing assembly, indicated generally at 22, is mounted in the bore 17 and is of conventional design having the elements noted with respect to the bearing 18.

Bearing assembly 18 is held on the outer end of the spindle 12 by a lock nut assembly which includes nuts 23 and 24 and an intermediate washer 25, the latter being fixed against rotation relative to the nut 23 by a plurality of locking pins 26 of known form.

A hub cap assembly 27 closes off the outer end of the bore 16 and includes a cylindrical hub cover 30 having a radially opening groove 31. A transparent window 32 has the outer peripheral edges thereof received in the annular groove 31 and sealed thereto by means of an annular gasket 33. The details of this construction are illustrated and described in my Patent No. 3,177,041. In the present design, however, the window 32 is provided with a wall portion forming a smooth annular opening 34 to facilitate insertion of a filler plug. A vent-type filler plug 35 is snapped in the smooth opening 34 and may be easily removed to permit access to the housing 15 for replenishing the lubricant supply while the vent equalizes internal and external pressures. Lubricant in the housing 15 is maintained at the prescribed level and easily checked by merely observing the level through the transparent window 32. The hub cover 30 is joined to the hub 14 by a plurality of bolts 36 extending through a flange portion 37 backed by a gasket 38, such being one known manner of attachment. Obviously, threaded attachment is also satisfactory.

Figures 2, 3:
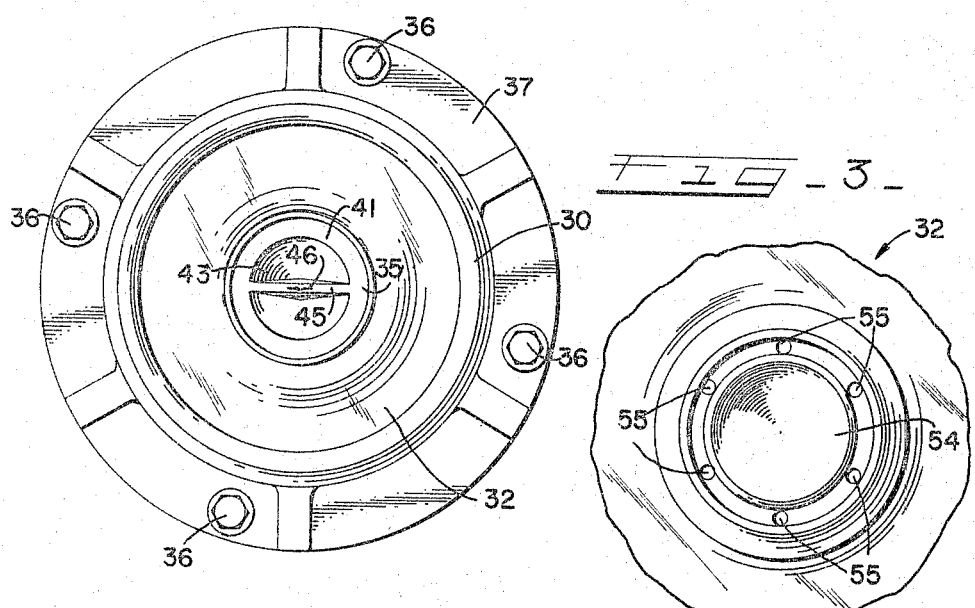
FIG. 2 is an end elevational view of the hub cap portion of the assembly of FIG. 1.
FIG. 3 is a fragmentary elevational view taken generally along the lines 3—3 of FIG. 1 and illustrating the inside portion of the vent-type filler plug.

Referring now to FIG. 6, the details of the vent-type filler plug 35 will be described. The filler plug 35 includes an annular body portion 40 which includes an integral disk-like face portion 41 and an outwardly flaring mounting portion 42. As seen in FIG. 2, the disk-like face portion 41 is of greater diameter than the mounting portion 42. A pair of shallow recesses 43 and 44 are formed in the face portion 41 which are separated by a transverse rib 45. Centrally of the rib is provided a knife slit forming a valve 46 which extends completely through the face portion 41 and communicates with a horn-shaped vent portion 47. The knife slit is practically undetectable since the natural resilience of the material forming the filler plug maintains it closed except during actual venting.

A generally circular axially opening groove 49 has the outer wall thereof formed by the inner wall 57 of the outwardly flaring mounting portion 42. The inner extremity of the groove 49 is formed by the outer wall of the vent 47 which terminates in a curl 48 adapted to direct fluid away from the mouth of the vent 47.

The mounting portion 42 is provided with a bore 50 terminating in a generally radial shoulder 51 which receives a very thin diaphragm 52. The diaphragm 52 is provided with a peripheral mounting portion 53 which is secured in the bore 50 by an adhesive or the equivalent, while an imperforate flexible center panel 54 is supported by the peripheral mounting portion 53 in axially spaced relation to the horn-shaped vent 47.

At the outer margin of the flexible panel 54 is provided a plurality of apertures 55 which communicate with the chamber 56 formed by the body portion 40 and diaphragm 52. The apertures 55 are radially spaced from the horn-shaped vent 47 presenting a tortuous path to preclude the escape of lubricant through the valve 46. Any lubricant which enters the chamber 56 will automatically drain or centrifuge from the groove 49 due to its shape.

As seen in FIGS. 4 and 5, when the filler plug 35 is installed, the mounting portion 42 is distorted and tightly engages the annular opening 34 within the window. The window 32 has the wall thickness thereof narrowed down to a very thin section 60 where it engages the circumferential portion 61 of the filler plug. Since the filler plug 35 is resiliently snapped into place there is no danger of damaging the window 32 and it is not subject to seizing. Moreover, since the wall 60 defining the opening 34 may be made of thinner material due to the absence of threads and the need for additional rigidification, the window may be more easily distorted for easier installation, the details of which are described in the patent alluded to above.

The novel filler plug 35 precludes the entry of water and dust into the housing 15 and is sufficiently sensitive to pressure that it will vent when the differential pressure between the ambient and the housing 15 is a few ounces. Due to the novel arrangement of the diaphragm 54, splashing of oil into the horn-shaped vent 47 is obviated. The escape of oil mist is also prevented. As pointed out previously, any escape of oil, no matter how negligible, gives the impression that appreciable oil loss has occurred as well as making the hub and wheel unsightly. In the present design, the circular groove 49 with its curled end 48 serves to centrifuge any condensate or oil mist which may enter through the ports 55 back into the chamber 15. The tortuous path, which the air pressure takes during the venting action, enhances condensing action and is illustrated by the arrows in FIG. 5. Direction of the centrifuging action of the groove 49 is indicated by the arrows in FIG. 4.

The filler plug 35 of the present invention provides advantages over known types of filler plugs in that it is easily installed and removed. The smooth opening 34 in the window permits insertion of a seal installation tool rod, for example one of the types shown in my Patent No. 3,123,902, of Mar. 10, 1964. In such event, the window serves the function of a centering plate. Any danger of cracking the transparent window 32 is avoided by the present design since the plug is capable of deforming to fit the opening 34 which may have an increased wall thickness. Due to the reduced axial thickness of the filler plug 35, the axial length of the hub 30 may be also reduced as is evident in the conventional hub assembly shown in FIG. 1. The filler plug 35 is extremely effective in precluding the entry of moisture or dirt into the housing 15 and also provides good venting action to maintain the pressure equalized. With the omission of threads on the present design, the window and vent plug 35 are manufactured more economically without a sacrifice of quality, yet they co-operate to form a fluidtight barrier. The diaphragm 52 serves to prevent splashing of the oil into the horn-shaped vent 47 whereby it would be pushed out on increase in pressure within the chamber 15. Accordingly, the present design is extremely satisfactory from the operational standpoint. Obviously, while the filler plug is described in conjunction with a specially shaped window, it is to be understood that window openings of other constructions and shapes may be used also.

Upon a consideration of the foregoing, it will become obvious to those skilled in the art that various modifications may be made without departing from the invention embodied herein. Therefore, only such limitations should be imposed as are indicated by the spirit and scope of the appended claims.

I claim:

1. A filler plug adapted for use in hub assemblies and the like, said filler plug comprising an annular body portion having an outwardly flaring mounting portion adapted for press-in constrictive fluidtight engagement with an opening in a hub cap, said body portion further including a disk-like face portion having an integral horn-shaped vent portion extending rearwardly within said mounting portion, said horn-shaped vent portion having a narrow slit at the intersection with said disk portion extending through said face portion to form a normally closed valve, a diaphragm covering said horn-shaped vent portion, said diaphragm being carried by said mounting portion and having a series of perforations adjacent the marginal edges thereof to permit indirect communication with said horn-shaped vent portion through said diaphragm while preventing direct contact of lubricant therewith.

2. A filler plug adapted for use in hub assemblies and the like, said filler plug comprising an annular body portion and a diaphragm portion, said annular body portion having an outwardly flaring mounting portion adapted for press-in constrictive fluidtight engagement with an opening in a transparent hub cap, said body portion further including a disk-like face portion of greater diameter than said mounting portion, a horn-shaped vent portion extending from the rearward side of said face portion, a normally closed slit in said disk-like face portion which communicates with said horn-shaped vent portion, said horn-shaped vent portion being spaced from said mounting portion and defining therewith an axially opening groove, said diaphragm covering said horn-shaped vent portion and having the outer periphery thereof secured in said mounting portion, and a series of perforations provided in said diaphragm adjacent the periphery thereof to permit indirect communication with said horn-shaped vent through said diaphragm.

3. In a hub assembly having an annular body portion with an axially projecting collar portion, window means closing off the outer end of said collar portion, said window means being of generally frusto-conical shape projecting outwardly from said collar portion, the outer central area of said window means being recessed and including an annular opening, the improvement which comprises said annular opening being formed to a smooth bore, a filler plug received in said annular opening, said filler plug comprising a body portion and a diaphragm portion, said body portion including a disk-like face portion and an integral outwardly flaring mounting portion, said mounting portion being fluidtightly received in said opening, a horn-shaped vent portion integral with said disk-like face portion projecting rearwardly within said mounting portion, a normally closed slit extending through said face-like portion into communication with said vent portion to permit the egress of air and preclude the ingress of foreign material, said diaphragm portion covering said horn-shaped vent portion and being held to said mounting portion around the marginal edges thereof, and a series of perforations adjacent said marginal edges to permit tortuous indirect communication with said horn-shaped vent portion for relieving pressure within said assembly without permitting escape of lubricant.

4. The improvement in claim 3 wherein said transparent window is provided with a smooth annular opening to receive said plug, said opening being adapted for use in centering a seal installation tool.

5. In a hub assembly having an annular body portion with an axially projecting collar portion, window means closing off the outer end of said collar portion, and being provided with an annular opening, the improvement which comprises a venting type filler plug received in said annular opening, said filler plug including a body portion and a diaphragm portion, said body portion including a disk-like face portion and an integral outwardly flaring mounting portion, said mounting portion being fluidtightly received in said opening, a horn-shaped vent portion integral with said disk-like face portion projecting rearwardly within said mounting portion, a normally closed slit extending through said face-like portion into communication with said vent portion to permit the egress of air and preclude the ingress of foreign material, said diaphragm portion covering said horn-shaped vent portion and being held to said mounting portion around the marginal edges thereof, and a series of perforations adjacent said marginal edges to permit tortuous indirect communication with said horn-shaped vent portion for relieving pressure within said hub assembly without permitting escape of lubricant.

References Cited by the Examiner
UNITED STATES PATENTS

| | | | |
|---|---|---|---|
| 2,854,287 | 9/1958 | Stephens | 301—108 |
| 2,973,230 | 2/1961 | Eastburg | 308—187 |
| 3,064,982 | 11/1962 | Stephens. | |
| 3,114,579 | 12/1963 | Isenbarger | 301—108 |
| 3,117,041 | 4/1965 | Isenbarger | 301—108 |

MILTON BUCHLER, *Primary Examiner.*

R. J. JOHNSON, *Assistant Examiner.*